US006995334B1

(12) United States Patent
Kovacevic et al.

(10) Patent No.: US 6,995,334 B1
(45) Date of Patent: Feb. 7, 2006

(54) SYSTEM AND METHOD FOR CONTROLLING THE SIZE OF THE MOLTEN POOL IN LASER-BASED ADDITIVE MANUFACTURING

(75) Inventors: Radovan Kovacevic, Plano, TX (US); Dongming Hu, Knoxville, TN (US); Michael E. Valant, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 10/649,927

(22) Filed: Aug. 25, 2003

(51) Int. Cl.
*B23K 26/34* (2006.01)
*G06F 19/00* (2006.01)

(52) U.S. Cl. .......................... 219/121.63; 219/121.64; 700/166

(58) Field of Classification Search ........... 219/121.63, 219/121.64, 121.62, 121.83; 700/118, 119, 700/166
See application file for complete search history.

(56) References Cited

U.S. PATENT DOCUMENTS

| | | | | |
|---|---|---|---|---|
| 5,182,430 A | | 1/1993 | Lagain | 219/121.63 |
| 5,477,026 A | * | 12/1995 | Buongiorno | 219/121.84 |
| 5,837,960 A | | 11/1998 | Lewis et al. | 219/121.63 |
| 6,046,426 A | | 4/2000 | Jeantette et al. | 219/121.63 |
| 6,122,564 A | * | 9/2000 | Koch et al. | 700/123 |
| 6,188,041 B1 | * | 2/2001 | Kim et al. | 219/121.63 |
| 6,213,168 B1 | | 4/2001 | Gaylo et al. | 141/12 |
| 6,251,488 B1 | | 6/2001 | Miller et al. | 427/596 |
| 6,311,099 B1 | * | 10/2001 | Jasper et al. | 700/166 |
| 6,349,600 B1 | | 2/2002 | Davies et al. | |
| 6,391,251 B1 | | 5/2002 | Keicher et al. | 419/7 |
| 6,401,001 B1 | | 6/2002 | Jang et al. | |
| 6,459,951 B1 | * | 10/2002 | Griffith et al. | 700/166 |
| 6,526,327 B2 | | 2/2003 | Kar et al. | |
| 6,555,780 B1 | * | 4/2003 | Kim et al. | 219/121.64 |
| 6,580,959 B1 | | 6/2003 | Mazumder | 700/121 |
| 6,605,795 B1 | * | 8/2003 | Arcella et al. | 219/121.63 |
| 6,638,787 B1 | * | 10/2003 | Buchin et al. | 438/75 |
| 6,757,055 B1 | * | 6/2004 | Kluft | 356/73 |
| 2002/0147521 A1 | | 10/2002 | Mok et al. | |
| 2002/0170890 A1 | | 11/2002 | Keicher et al. | 219/121.64 |
| 2004/0107019 A1 | | 6/2004 | Keshavmurthy et al. | |

FOREIGN PATENT DOCUMENTS

| | | | |
|---|---|---|---|
| JP | 11-179578 A | * | 7/1999 |
| JP | 2001-79679 A | * | 3/2001 |
| JP | 2001-287064 A | * | 10/2001 |
| JP | 2002-239767 A | * | 8/2002 |
| WO | WO-03/070414 A1 | * | 8/2003 |

OTHER PUBLICATIONS

B. Grunenwald et al., "*New Technologic Developments in Laser Cladding*", Proceedings of the international Congress on Applications of lasers and Electro-Optics (ICALEO 1993), pp. 934-944, 1993.

(Continued)

*Primary Examiner*—Geoffrey S. Evans
(74) *Attorney, Agent, or Firm*—Baker Botts L.L.P.

(57) ABSTRACT

According to one embodiment of the invention, a method for controlling the size of the molten pool in a laser based additive manufacturing process includes coaxially aligning an imaging device with a laser nozzle and imaging a molten pool, created by a laser, on a substrate with the imaging device. The method further includes comparing at least one characteristic of the molten pool with a respective characteristic of a target molten pool, and adjusting, in substantially real-time, a laser power of the laser based on the comparison in order to correlate the characteristic of the molten pool with the respective characteristic of the target molten pool.

26 Claims, 8 Drawing Sheets

OTHER PUBLICATIONS

Lli et al., "*Sensing, Modelling and Closed Loop Control of Powder Feeder for Laser Surface Modification*", Proceeding of the International Congress on Applications of Lasers and Electro-Optics (ICLEO 1993), pp. 965-974, 1993.

F. Meriaudeau et al., "*Acquisition and Image Processing System Able to Optimize Laser Cladding Process*", From the Proceeding of ICSP '96, Laboratoire GERE—Universitéde Bourgogne, France, pp. 1628-1631, Dec. 1996.

William H. Hofmeister et al, "*Video Monitoring and Control of the Lens Process*", Proceedings of AWS 9th International Conference on Computer Technology in Welding, 1998, pp. 187-196, Sep. 1998.

Ivan S. Kmecko et al., "*Influence of Geometrical Factor on Heat Transfer Rate During GTAW for Welding-Based Deposition*", Proceedings of Free Symposium of Nontraditional Manufacturing Research and Applications, the 2001 International Mechanical Engineering Conference, Nov. 11-16, 2001., New York, N.Y., (9 pages), Nov. 2001.

D. Hu et al., "*Improving Solid Freeform Fabrication by Laser-Based Additive Manufacturing*", Research Center for Advanced Manufacturing, Southern Medodist University, Richardson, Texas, USA, © ImechE, 2002, Proc. Instn Mech. Engrs vol. 216 Pat B: J. Engineering Manufacturing, pp. 1253-1264, Sep. 2002.

D Hu et al., "*Modelling and Measuring the Thermal Behavior of the Molten Pool in Closed Loop Controlled Laser-Based Additive Manufacturing*", Research Center for Advanced Manufacturing, Southern Methodist University, © ImechE, 2003, Proc. Instn Mech. Engrs vol. 217 Pat B: J. Engineering Manufacturing (12 pages), Apr. 2003.

Dongming Hue et al., "*Sensing, Modeling and Control for Laser-Based Additive Manufactures*", International Journal of Machine Tools & Manufacture 43 (2003) pp. 51-60, Jan. 2003.

* cited by examiner

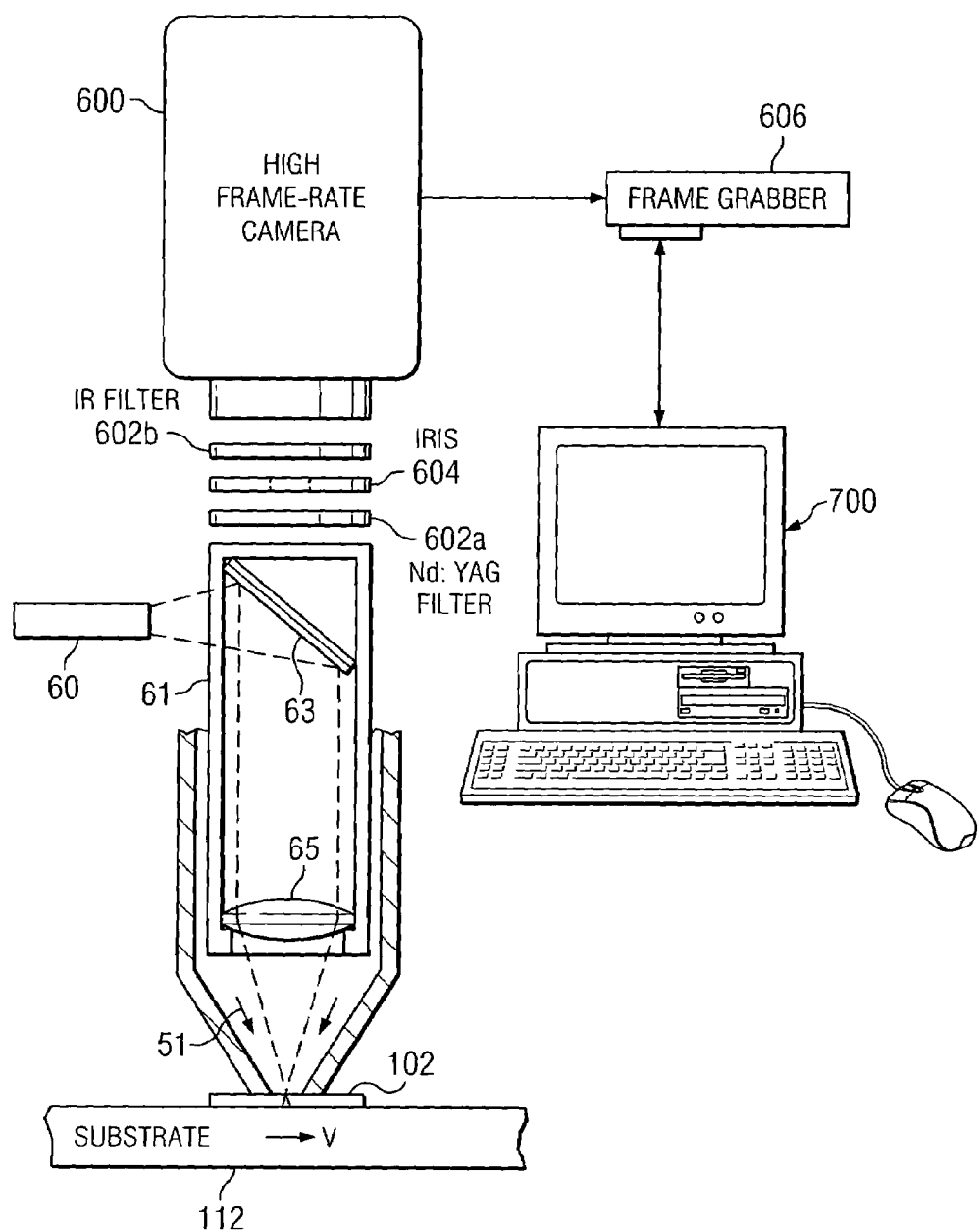

SYSTEM AND METHOD FOR CONTROLLING THE SIZE OF THE MOLTEN POOL IN LASER-BASED ADDITIVE MANUFACTURING

TECHNICAL FIELD OF THE INVENTION

This invention relates generally to the field of rapid manufacturing and, more specifically, to a system and method for controlling the size of the molten pool in laser-based additive manufacturing.

BACKGROUND OF THE INVENTION

In laser-based additive manufacturing ("LBAM"), a laser beam creates a weld pool into which powder is injected and melted. The substrate is scanned by the laser/powder system in order to trace a cross-section. Upon solidification, the trace forms a cross-section of a part. Consecutive layers are then additively deposited, thereby producing a three-dimensional component.

Sandia National Laboratories developed a technology known as Laser Engineering Net Shaping ("LENS") to fabricate metal components directly from CAD solid models and thus further reduce the lead times for metal part fabrication. A similar process named Directed Light Fabrication ("DLF") is under development at Los Alamos National Laboratory. The DLF process is more flexible because it has 5-axis positioning capability. This allows the manufacture more complex parts (i.e., overhangs) at the expense of increased cost and process planning complexity.

A variant of these two approaches is under development at the Fraunhofer Institute for Production Technology ("IPT") named Controlled Metal Build Up ("CMB"). In this process the high-speed 2½ axis CNC milling operation ensures that the required levels of form and dimensional accuracy, as well as of edge sharpness, are met. Numerous metallic materials ranging from bronze through steel to the hard alloys, frequently used to protect against wear, can be processed using this method. The fact that a high-speed milling operation takes place after each application of a new layer makes it possible to produce narrow deep grooves, since the engagement depth of the milling tool remains at a constant, low level. By virtue of the generative, layer-by-layer nature of this technique, the CAD data can be processed more quickly and with considerably less effort than is required for conventional 5-axis milling.

SUMMARY OF THE INVENTION

According to one embodiment of the invention, a method for controlling the size of the molten pool in a laser based additive manufacturing process includes coaxially aligning an imaging device with a laser nozzle and imaging a molten pool, created by a laser, on a substrate with the imaging device. The method further includes comparing at least one characteristic of the molten pool with a respective characteristic of a target molten pool, and adjusting, in substantially real-time, a laser power of the laser based on the comparison in order to correlate the characteristic of the molten pool with the respective characteristic of the target molten pool.

Embodiments of the invention provide a number of technical advantages. Embodiments of the invention may include all, some, or none of these advantages. According to one embodiment of the invention, a system for manufacturing or repairing parts produces better accuracy than a purely additive solid freeform fabrication ("SFF") process due to the introduction of intermediate material removal procedures. In addition, the materials and deposition methods utilized are not constrained by the resolution of the deposition, since the accuracy of the parts is controlled by the shaping processes. Another technical advantage is that no custom fixturing is required. Fixtures are inherent in the additive/subtractive manufacturing method; support structures and all previously built layers automatically serve as fixtures for the subsequent layers. Employing an additive/subtractive manufacturing method also opens up the engineering design space. Parts may be embedded with prefabricated components, such as electronic devices or sensors. In addition, it is capable of constructing internal intricate features as well as integrated assembly mechanisms.

According to another embodiment of the invention, the operational welding parameters of welding-based deposition processes are controlled to facilitate homogeneous mechanical properties across the volume of a three-dimensional part. In addition, the microstructural of a part may be controlled to tailor the properties of the part to an optimized solution.

According to another embodiment of the invention, a closed-loop control system based on infrared image sensing for controlling the size of the molten pool in a laser-based additive manufacturing ("LBAM") process improves the geometrical accuracy of parts and simultaneously provides the desired microstructure.

According to another embodiment of the invention, a powder delivery system permits precise control of a metering device that is continuously fed or dosed from a hopper with an amount of a powder that is delivered to a molten pool formed on a functional component and/or sacrificial substrate component in a LBAM process or apparatus. Such a powder delivery system may be used to produce a functional part, including a functionally gradient part ("FGP"), having desired chemical and/or mechanical properties.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 6 is a cross sectional elevation view of a powder nozzle according to one embodiment of the invention;

DETAILED DESCRIPTION OF EXAMPLE EMBODIMENTS OF THE INVENTION

Example embodiments of the present invention and their advantages are best understood by referring now to FIGS. 1A through 9 of the drawings, in which like numerals refer to like parts.

Figure 1A:
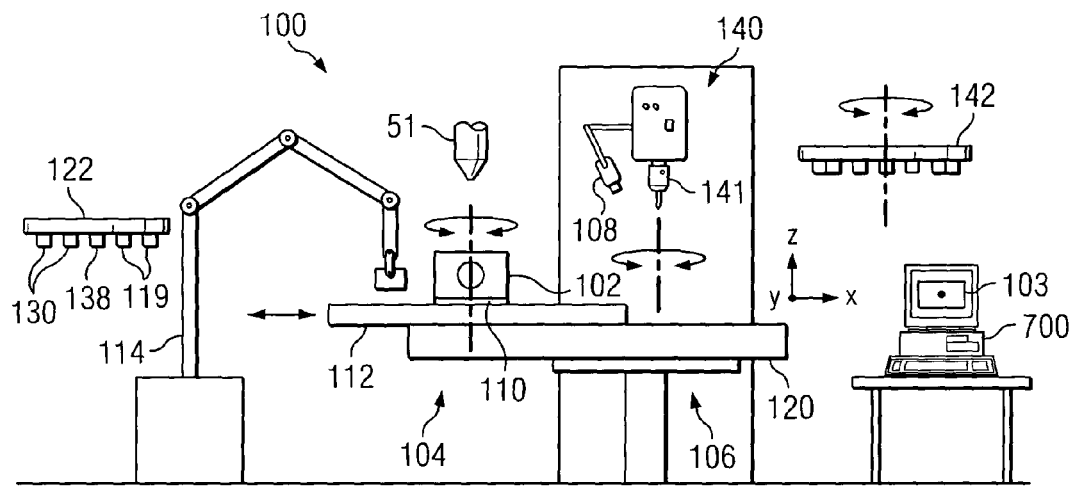
FIGS. 1A and 1B are elevation and plan views, respectively, of a system for manufacturing or repairing parts according to one embodiment of the invention.
Figure 1B:
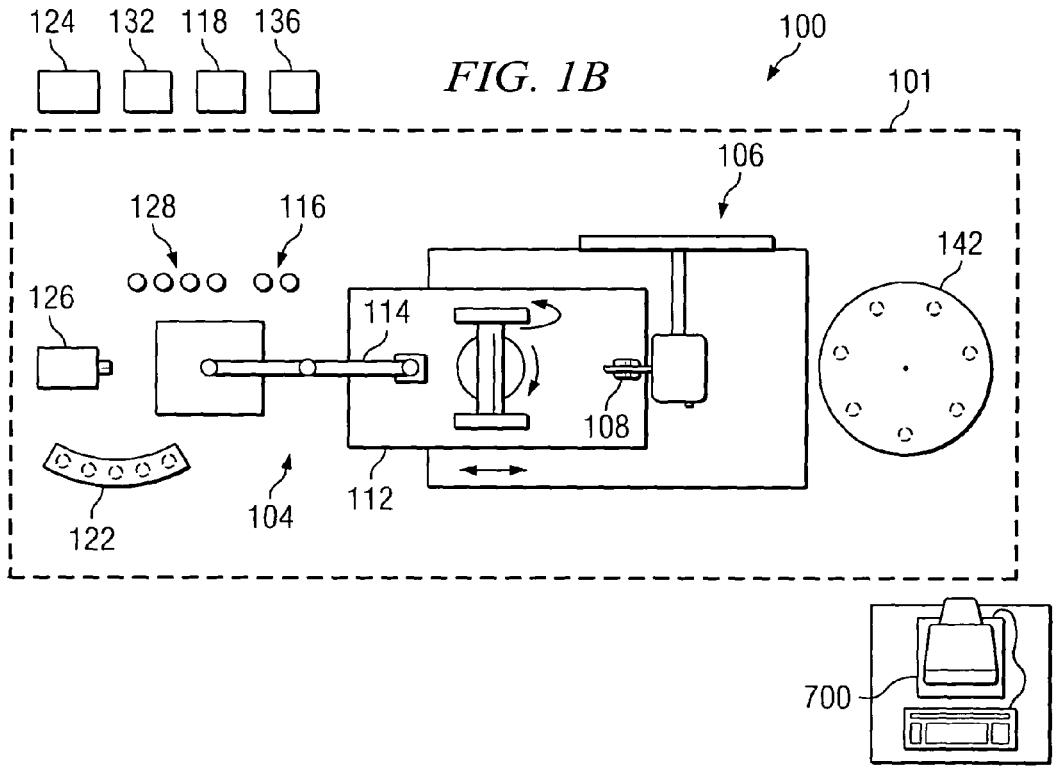

FIGS. 1A and 1B are elevation and plan views, respectively, of a system 100 for manufacturing or repairing parts according to one embodiment of the invention. As described below, this multi-fabrication system provides the capability to make complex parts having internal and external geometric features with high dimensional accuracy and superior surface quality. For example, the same setup for one computer controlled system platform, system 100 may perform the following operations: four additive operations and/or their combination, a plurality of subtractive operations, in-process and post-process inspection, and scanning for reverse engineering. The combination of additive and subtractive processes exhibits some technical advantages, such as the production of more accurate complex parts, as well as materials and deposition processes that are not constrained by the resolution of the deposition since the accuracy of the parts may be controlled by the shaping process. In addition, no custom fixturing is required; fixtures are inherent in additive/subtractive rapid manufacturing processes because support structures in all previously built layers automatically serve as fixtures for subsequent layers. Although system 100 may be suitable for many applications, system 100 may be particularly suitable for a "parts hospital." Such a parts hospital may contribute to the strengthening of America's military readiness. Accordingly, the components of system 100 may be contained within an enclosure 101 for ease of mobility, or the components of system 100 may be free-standing on a shop floor or other suitable location.

The illustrated embodiment, system 100 includes a computer 700 operable to control the fabrication or repair of a three-dimensional part 102 using digital data, such as any suitable solid computer aided design ("CAD") model 103. Solid CAD model 103 may be generated using any suitable CAD application, such as Catia, Pro Engineer, Solid Designer, SolidEdge, and Unigraphics, among others. To control the fabrication of part 102, computer 700 is coupled to a deposition station 104 and a machining station 106. Computer 700 may also be coupled to an inspection station, denoted in FIGS. 1A and 1B by an inspection device 108.

Deposition station 104 is operable to deposit successive two-dimensional layers of material to fabricate part 102. Accordingly, deposition station 104 includes a substrate 110 upon which part 102 is fabricated, a two rotary axis shifting platform 112 to support substrate 110, a plurality of deposition systems, and a multi-axis robot 114 that is operable to, when directed by computer 700, utilize one of the deposition systems to deposit any of the two-dimensional layers of material when fabricating part 102. Multi-axis robot 114 may be any suitable industrial robot having any suitable number of multiple axes. For example, in a particular embodiment of the invention, multi-axis robot 114 is a six-axis robot.

The deposition systems may include a welding-based deposition system, a laser-based deposition system, and a plasma powder cladding system. Any one of these deposition systems or combination of deposition systems may be utilized in depositing any of the two-dimensional layers of material. An advantage of having multiple deposition systems is that the advantages of each individual deposition system may be maximized to facilitate the fabrication of a complex part having high dimensional accuracy and superior surface quality in the least amount of time. For example, a welding-based deposition system is characterized by a metal deposition rate one order of magnitude faster than a laser-based deposition system, while a laser-based deposition system is characterized by the ability to build finer geometrical features with a smaller heat affected zone, less porosity, multiple material composition, better control the material properties, and the possibility to deposit metal powder in any direction. Each of these deposition processes is described in more detail below.

Substrate 110 may be any suitable substrate upon which part 102 is fabricated. In other embodiments of the invention, substrate 110 is not utilized and part 102 is directly fabricated upon two rotary shifting platform 112. Two rotary shifting platform 112, in one embodiment, not only is able to translate in the x, y, and z directions but is also able to rotate around vertical and horizontal axes. As described in more detail below, two rotary shifting platform 112 works in conjunction with a multiple axis worktable 120 of machining station 106 when material removal is required during the fabrication of part 102.

A welding based deposition system utilized in system 100 may be any suitable welding based deposition system, such as a gas metal arc welding ("GMAW") system, a gas tungsten arc welding ("GTAW") system, or other suitable welding based deposition system having consumable or non-consumable electrodes. Welding based deposition system includes one or more wire feeders 116, a welding power source 118, and one or more welding torches 119. Depending upon the welding process utilized, one or more inert gasses 121 may also be utilized. For a welding based deposition system to be utilized in system 100, computer 700 directs multi-axis robot 114 to obtain a particular welding torch 119 from automatic changer 122 and to choose a particular wire feeder 116 to utilize. Welding torch 122 would then be placed in proximity to substrate 110 in order to deposit a two-dimensional layer of material for part 102. Computer 700 may utilize any suitable computer aided manufacturing ("CAM") software or other suitable software for the control of robot 114.

A laser based deposition system utilized for system 100 may be any suitable laser based system, such as a Nd:YAG laser deposition system 124, a diode laser deposition system 126, or other suitable laser based additive manufacturing system. A laser based deposition system includes one or more powder feeders 128, and one or more laser heads 130. A laser chiller 132 may also be utilized depending upon the laser based deposition system utilized. When laser based deposition system is utilized to deposit a two-dimensional layer for part 102, as directed by computer 700, multi-axis robot 114 obtains a particular laser head 130 from automatic changer 122 and one or more powder feeders 128 is coupled to the particular laser head 130 so that the two-dimensional layer of material may be deposited. A particular laser based deposition system is described below in conjunction with FIGS. 2 through 6.

A plasma powder cladding system utilized in system 100 may be any suitable plasma powder cladding system having a plasma transferable arc power source 136. When solid CAD model 103 directs that a particular two-dimensional layered material needs to be deposited by plasma powder cladding, computer 700 directs multi-axis robot 114 to obtain a plasma torch 138 from automatic changer 122, and suitably couple one or more powder feeders 128 to plasma torch 138 in order for the two-dimensional layer to be deposited.

Depending upon the solid CAD model 103 for part 102, various geometrical features may need to be formed in part 102 by a material removal processes. Therefore, machining station 106 needs to be utilized.

Machining station 106 may be any suitable machining station that is operable to perform any suitable removal processes. In the illustrated embodiment, machining station 106 includes a multi-axis CNC milling machine 140. Any suitable number of axes may be associated with multi-axis CNC milling machine 140, such as a 3 axis, 4 axis, 5 axis, or other suitable axes. Multi-axis milling machine 140 may be operable to perform any suitable material removal operations, such as milling, drilling, boring, reaming, tapping, grinding, polishing, vertical turning, or other suitable material removal process.

In order to facilitate a particular removal process, an automatic tool changer 142 is associated with CNC milling machine 140. Automatic tool changer 142 houses all the appropriate tools for a particular material removal operation. Automatic tool changer 142 may be directly coupled to CNC milling machine 140 or may be separate from CNC milling machine 140. If a particular material removal operation needs to be performed on part 102, computer 700 directs CNC milling machine 140 to obtain the desired tool from automatic tool changer 142 in order that the process may be carried out. As discussed in more detail below, two-rotary shifting platform 112 translates underneath a machining head 141 of CNC milling machine 140 in order that the process be carried out. The two-rotary shifting platform 112 may be coupled to or associated with work table 120 of CNC milling machine 140 in any suitable manner.

In addition to performing intermittent material removal processes on part 102, inspection of part 102 either during the fabrication or after the fabrication of part 102 may be performed by system 100. As illustrated in FIGS. 1A and 1B, an inspection device 108 may be utilized for this intermediate or post-processing inspection. Inspection device 108 may be coupled to CNC milling machine 140 or may be located separately from CNC milling machine 140. Any suitable inspection device or devices may be utilized for inspecting part 102. These inspection devices are well known in the art of material fabrication. Inspection device 108 may also be controlled by computer 700 and may provide feedback to computer 700 in order that computer 700 can make adjustments during the fabrication of part 102. Examples of this are described below in conjunction with FIGS. 7 through 9.

In a particular embodiment of invention, inspection device 108 or other suitable scanning devices may be utilized to reverse engineer a part. This reverse engineering may be utilized to create a solid CAD model of the reverse engineered part so that a new part having the same geometrical configuration may be produced by system 100.

As described in more detail below, feedback to computer 700 is an important feature of the present invention. Suitable laser scanning devices and other suitable monitoring devices are utilized throughout system 100 in order that part 102 may be fabricated accurately. For example, the parameters of a deposition process may be changed on a substantially real-time basis so that the dimensional accuracy, mechanical properties, or other characteristics of part 102 may be optimized. For example, during a laser based deposition process, the amount of powder delivered to the molten pool that is created during the process may be controlled. An embodiment of this is described below in conjunction with FIGS. 2 though 6. Another example is the controlling of the molten pool in a laser based additive manufacturing process. An embodiment of this is described below in conjunction with FIGS. 6 through 8. A still further example is the control of the heat affected zone within part 102 during a welding based deposition process. An embodiment of this is described below in conjunction with FIGS. 7 and 8.

Figure 2:
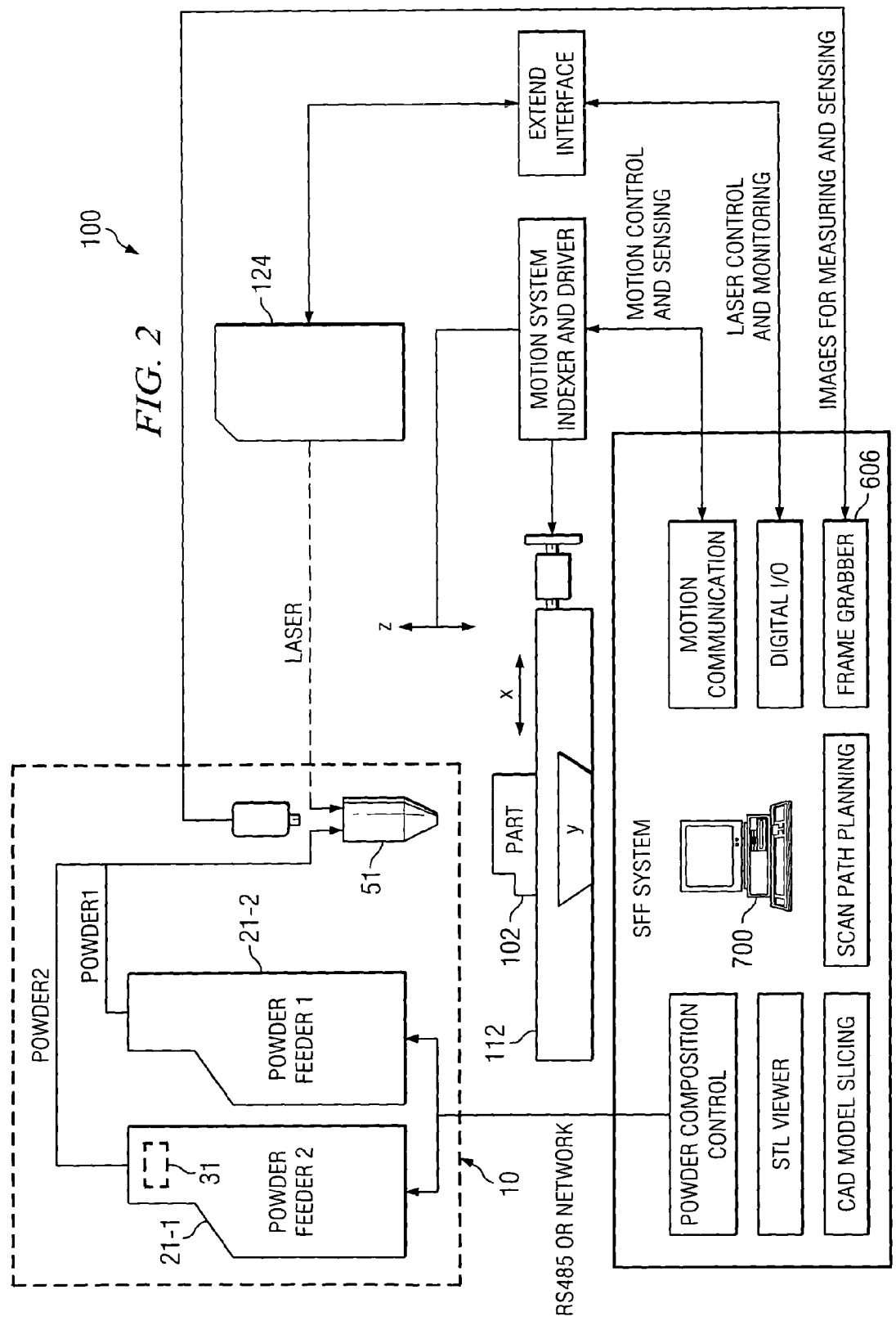
FIG. 2 is a block diagram of a laser based additive manufacturing ("LBAM") system that includes a powder delivery system according to one embodiment of the invention.

FIG. 2 illustrates an embodiment of system 100 in which system 100 is an LBAM system that includes a powder delivery system 10 according to one embodiment of the invention. The illustrated LBAM system is utilized in the fabrication of part 102. In a particular embodiment, part 102 is in the form of a "functionally gradient part" ("FGP") having varied chemical and/or mechanical properties at differing portions of part 102.

Powder delivery system 10, in the illustrated embodiment, includes one or more hoppers 21 having corresponding hopper outputs to contain and continuously feed the powder to a downstream portion of powder delivery system 10. Any suitable number of hoppers 21 may be used in powder delivery system 10 and each may include the same or a different powder than each of the other hoppers 21. In the illustrated embodiment, two hoppers 21-1, 21-2, each include a different powder. Any suitable powder may be utilized, such as a metal powder, a ceramic powder, and a carbide powder. Hoppers 21 may be of any suitable type, such as a gravity fed hopper, so long as the powder may be satisfactorily contained and continuously fed to the downstream portion of powder delivery system 10. In one embodiment, the downstream portion includes a metering device 31 associated with one or more of the hoppers 21, as described in further detail below in conjunction with FIG. 3.

Figure 3:
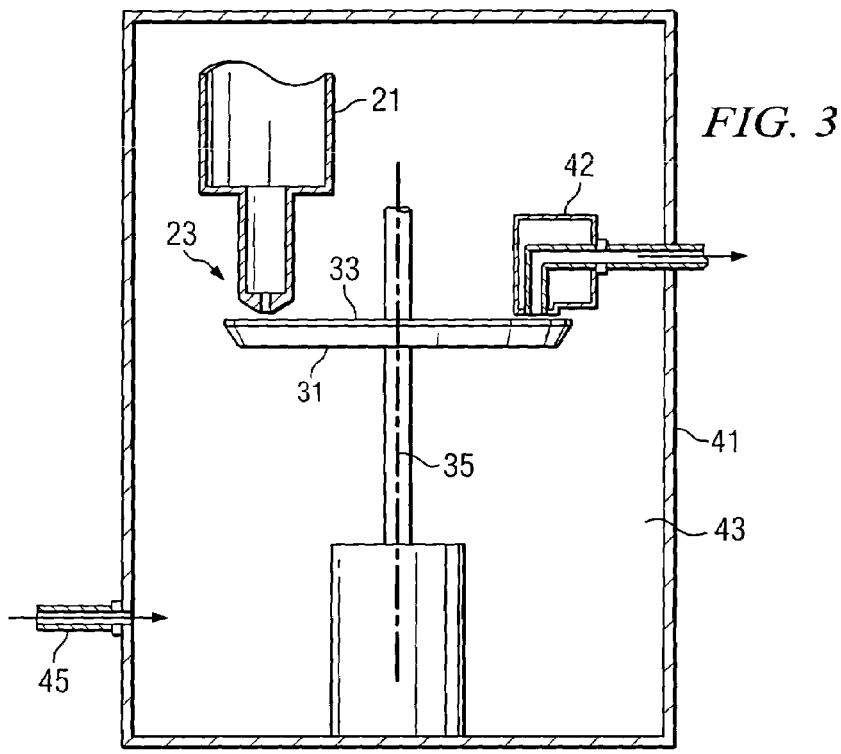
FIG. 3 shows an elevation view of a portion of the powder delivery system of FIG. 2 according to one embodiment of the invention.

FIG. 3 is an elevation view of a portion of powder delivery system 10 illustrating metering device 31 according to one embodiment of the invention. Although a specific embodiment of metering device 31 is illustrated FIG. 3, metering device 31 may be of any suitable type, so long as metering device 31 can function to receive powder continuously fed or dosed from hopper 21 and deliver the powder to a downstream portion of powder delivery system 10. In the illustrated embodiment, powder is continuously fed or dosed from hopper 21 to a substantially flat surface 33 of metering device 31. This may be achieved by disposing metering device 31 proximate an output 23 of hopper 21 by a prescribed gap. Metering device 31 is rotated about an axis of rotation 35 at a predetermined rate of rotation. By this arrangement, a quantity of powder delivered from output 23 of hopper 21 at a continuous feeding rate may be "sheared off" from a quantity of the powder remaining in hopper 21 by flat surface 33.

Because the powder is deposited on flat surface 33, the feeding or dosing of the powder to metering device 31 is continuous for a given rate of rotation of metering device 31. This is in contrast to a metering device that is non-continuously fed or dosed with the powder, which typically includes discrete areas having varying amounts of powder disposed thereon for a given flow rate. The geometry of output 23 of hopper 21, the rate of rotation of metering device 31, the prescribed gap between output 23 and flat surface 33, and the properties of the powder, among other factors, determine a mass and/or a volumetric feeding rate of the powder delivered to metering device 31. Although any suitable mass and/or a volumetric feeding rate may be utilized, it has been determined through experimentation that metering device 31 may be continuously fed at a relatively small feeding rate (e.g., from a minimum of about 1.0 grams/minute to a maximum of about 15.0 grams/minute) and a relatively continuous feeding rate (e.g., with a variance about 1.0 grams/minute or less). In addition, the continuous feeding rate may be changed over a relatively short time interval (e.g., less than about 3 seconds, and more preferably, to less than about 1 second). Such precise control over the feeding rate of each of a plurality of individual powders may be used to fabricate a functionally gradient part ("FGP"), such as part 102.

Figure 4:
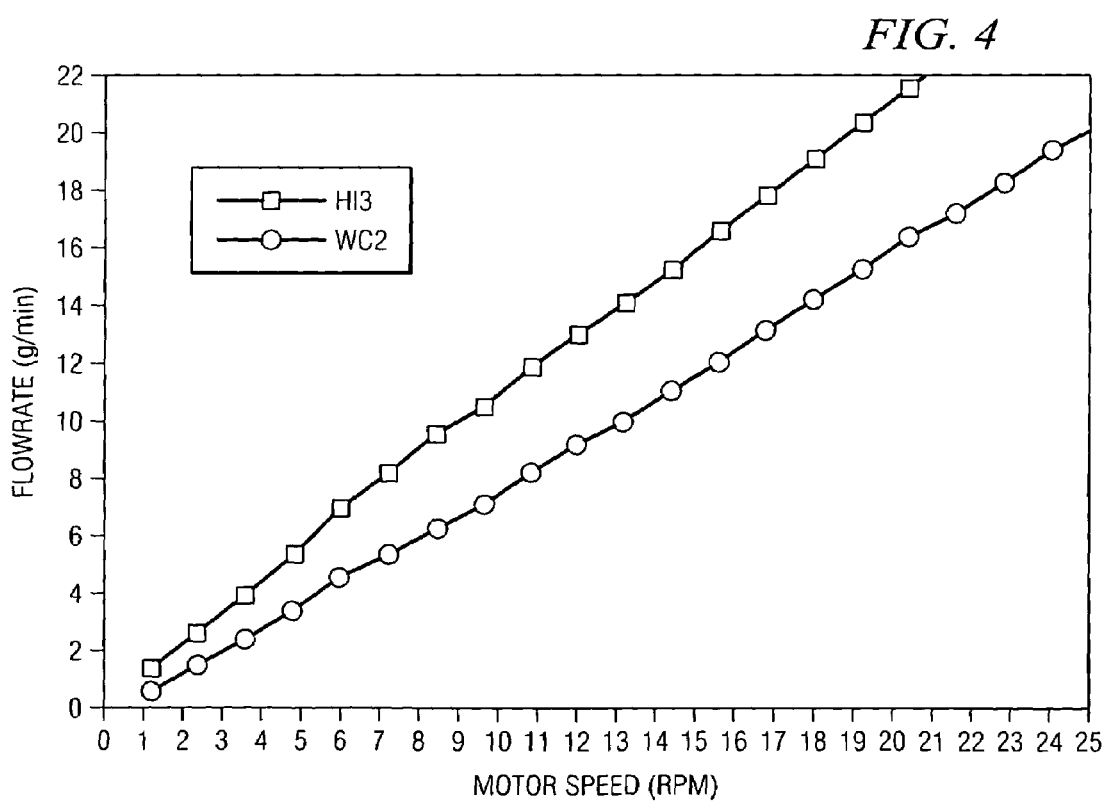
FIG. 4 is a graphical representation of powder feeding rates as a function of rates of rotation of a metering device according to one embodiment of the invention.

FIG. 4 is a graphical representation 39 of powder feeding rates as a function of rates of rotation of metering device 31. As shown in FIG. 4, it has been determined through experimentation that for a given set of factors, the feeding or dosing rate of powder to metering device 31 varies almost linearly with the rate of rotation of metering device 31. Further, for a given set of factors, coarse adjustments of the feeding or dosing rate to metering device 31 may be achieved by varying the size of the prescribed gap between output 23 of hopper 21 and the metering device 31, either manually or automatically (e.g., by computer control), and/or that fine adjustments of the feeding or dosing rate may be achieved by varying the rate of rotation of metering device 31.

Figure 5:
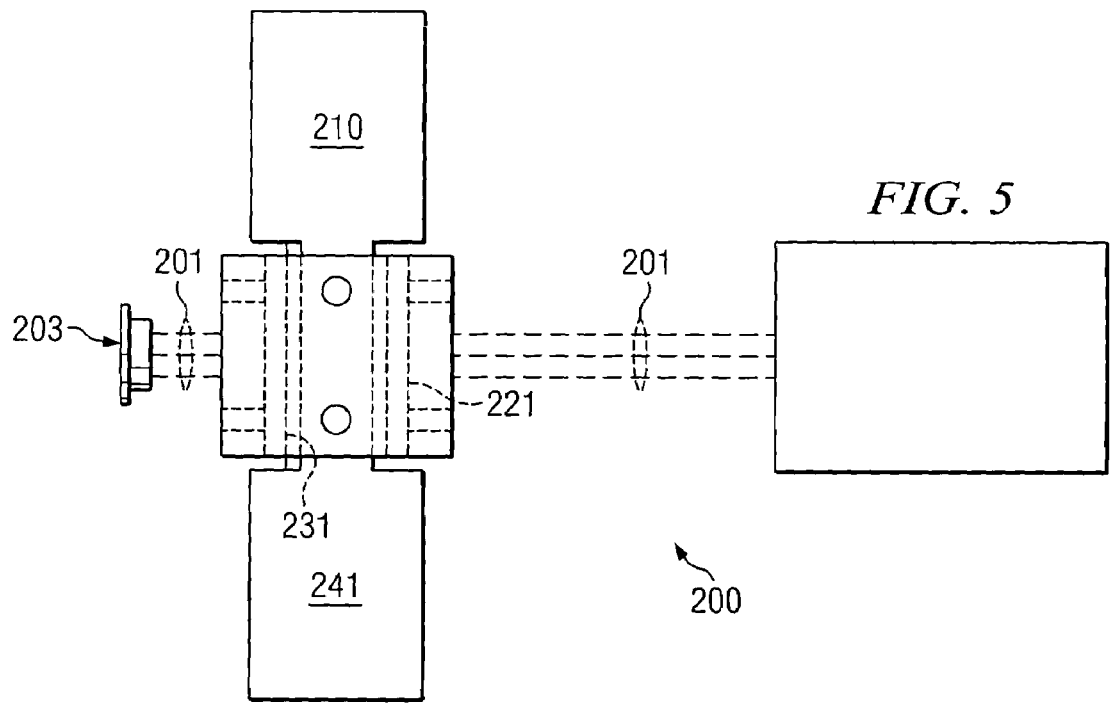
FIG. 5 shows a plan view of a flow determining device including an optical electronic system according to one embodiment of the invention.

Powder delivery system 10 may include one or more mass and/or volume flow determining devices to determine the feeding rate of powder delivered from hopper 21. In one embodiment of the invention, an optical electronic system 200 may be used to determine a volumetric feeding rate of the powder, as illustrated in FIG. 5. In addition, a scale (not shown) may be used to directly measure a mass feeding rate.

Referring to FIG. 5, optical electronic system 200 includes a collimated and/or expanded laser beam 201 and a light detecting or optical sensor 203. The laser beam 201 is disposed on a first side of the powder delivered from a powder delivery nozzle 51 (FIGS. 2 and 6), and optical sensor 203 is disposed on a second side thereof. As a density of the powder flowing from powder delivery system 10 to the component part 102 changes, an amount of laser light scattered by the powder increases or decreases accordingly. As such, an amount of laser light received by optical sensor 203 also decreases or increases. Accordingly, optical sensor 203 can output a voltage in proportion to the amount of incident light received by optical sensor 203. Through any suitable calibration process, the volumetric feeding rate of the powder may be determined from the voltage output of optical sensor 203.

The optical electronic system 200 may further include an electronic device (not shown) for determining the mass feeding rate of the powder based on both (i) the volumetric feeding rate of the powder and (ii) known or predetermined properties of the powder. For example, any suitable computer (not shown) may be controlled as a proportional, integral, derivative ("PID") controller and/or as a fuzzy logic controller to determine the mass feeding rate. Parameters of powder delivery system 10 may be adjusted (e.g., the rate of rotation of metering device 31, the prescribed gap between flat surface 33 and output 23 of hopper 21, etc.) based on a difference between the measured feeding rate and the desired feeding rate to achieve the desired feeding rate.

Optical electronic system 200 may be housed within a closed structure to minimize an influence of external factors acting on the powder at the point of volumetric flow determination. For example, the optical electronic system 200 may include a cell 210 defining a volume through which the powder flows. The cell 210 may include a first window 221 for receiving the laser light into the interior of the volume and a second window 231 for transmitting the light to optical sensor 203. One or both of the windows 221, 231, may be coated with a transparent conductive layer that prevents a static charge buildup on the glass windows, thereby preventing the powder from adhering thereto. In one embodiment, the coating is Indium Tin Oxide. The cell may also include a metal block 241 to ground one or both of the windows 221, 231 thereto. One or more seals (not shown) may be disposed around at least part or all of one or both of windows 221, 231 to further isolate the volume of cell 210 from external factors. One or more, and preferably two, air ionizers (not shown) may be placed in contact with and/or apart from cell 210 to direct a combination of positively and negatively charged ions at cell 210, thereby removing the static charge from the windows 221, 231.

As discussed above, the feeding rate determining device may also include a scale that can directly measure the mass feeding rate of the powder. The scale may be insensitive to noise and/or to vibration. In one embodiment, a strain gauge may be used to measure a strain and, consequently, the change in mass of the powder in the hopper 21.

Referring back to FIG. 3, in one embodiment, metering device 31 is a disk, and more preferably, a flat disk having an approximately circular cross section. Further, the disk may be rotated by any suitable device, such as a direct current ("DC") stepper motor. The use of a DC stepper motor permits a precise adjustment of the rate of rotation of metering device 31. A powder removal device 41 may remove the powder from flat surface 33. The present invention may include any suitable powder removal device 41, so long as powder removal device 41 can remove the powder from metering device 31 and deliver the powder to a further downstream portion of powder delivery system 10. In a preferred embodiment, each of metering devices 31, and consequently, each of the hoppers 21, may include a separate powder removal device 41.

In one embodiment of powder removal device 41, a vacuum device 42 is disposed in a chamber 43 that includes a carrier gas input orifice 45. A carrier gas may be introduced into chamber 43 through input orifice 45 and may be removed from chamber 43 through any suitable opening in vacuum device 42. By this arrangement, the inflow and outflow of the carrier gas can create a vacuum capable of removing the powder from flat surface 33 of metering device 31. The carrier gas may be any suitable gas so long as the performance of powder delivery system 10 is not unsatisfactorily degraded. In one embodiment, carrier gas is an inert gas, such as argon.

In an alternate embodiment of the invention, powder removal device 41 includes a scraper or scraping device (not shown) in lieu of vacuum device 42 to remove powder from metering device 31. The scraper device may include a blade that contacts flat surface 33 of metering device 31 to scrape or push the powder therefrom. However, such a powder removal device may suffer from a disadvantage in that the scraper and/or metering device 31 may become worn from extended use and contact therebetween. Wear of one or both of these components may result in the formation of an undesirable gap between the powder removal device and metering device 31, which may prevent the powder delivered to metering device 31 from being satisfactorily removed therefrom and degrade the accuracy of powder delivery system 10. In another alternate embodiment of the invention, powder removal device 41 includes a suitable air-blower or air-blowing device (not shown) to move a volume of air to push the powder from metering device 31.

Powder removal device 41 may deliver a plurality of differing powders from a plurality of hoppers 21 to a mixing unit or manifold (not shown) and subsequently to a powder nozzle 51 (FIGS. 2 and 6), or alternatively may deliver a single powder from a single hopper 21 to powder nozzle 51. Thus, during the manufacture of a FGP, for example, the mixing manifold may ensure that the differing powders are thoroughly mixed before the powders are delivered to the further downstream portion of powder delivery system 10.

Referring to FIG. 6, powder nozzle 51 may receive powder delivered by powder removal device 41 and deliver the powder to part 102 being fabricated by system 100. Powder nozzle 51 surrounds a laser beam 60 that is used to form a molten pool on part 102. As discussed above, a carrier gas may be used to deliver the powder around laser beam 60 and through powder nozzle 51 to part 102. In a preferred embodiment, an argon gas that is used to remove the powder from metering device 31 may also be used to deliver the powder to component part 102 through powder nozzle 51.

Laser beam 60 may be generated from any suitable laser system. A laser head 61 including a partially reflective mirror 63 and a focusing lens 65 directs laser light from laser beam 60 onto part 102, such that a molten pool is formed on part 102. The delivered powder then contacts the molten pool and melts, thereby adding material to part 102. In one embodiment, laser beam 60 is generated by a one thousand watt (1000 W) Nd:YAG laser; however, laser beam 60 may be of any suitable type.

Also illustrated in FIG. 6 is an infrared sensing device 600 that is operable to sense a molten pool during material deposition by a laser based deposition system. Infrared sensing device 600 senses infrared radiation during the LBAM process after passing through suitable filters 602 sandwiching an iris 604. Infrared sensing device 600 is coupled to a frame grabber 606, which in turn is coupled to computer 700. Details of computer 700 are described below in conjunction with FIG. 7.

Infrared sensing device 600 may be any suitable infrared sensing device, such as a high-frame rate digital charge coupled device ("CCD") camera. Obtained infrared images during the LBAM process may be calibrated using an ultra-high shutter speed camera assisted with a pulsing nitrogen laser. The shape of the molten pool during the LBAM process may be captured in substantially real-time and fed to computer 700 so that computer 700 may determine whether or not adjustments should be made of the parameters of the LBAM process during the deposition. For example, with respect to the LBAM process described in FIGS. 2 through 6, the prescribed gap between output 23 of hopper 21 and top surface 33 of metering device 31 may be adjusted, the rotational speed of metering device 31 may be adjusted, or other suitable adjustments may be carried out. Various adjustments may also be made to the laser based additive manufacturing system to control the molten pool during the deposition of the material. This is described in greater detail below in conjunction with FIGS. 7 and 8. A computer 700, which stores solid CAD model 103, may also control the heat affected zone within part 102 based on the geometrical features of solid CAD model 103. The details of one embodiment of this is described below in conjunction with FIGS. 7 and 9.

Figure 7:
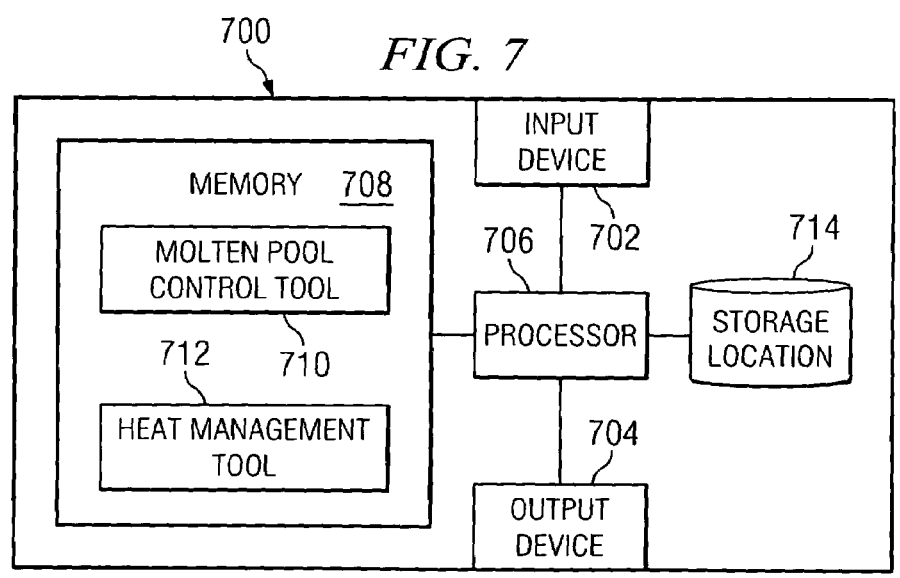
FIG. 7 is a block diagram of a computer for use in the system of FIGS. 1A and 1B according to an embodiment of the invention.

FIG. 7 is a block diagram of computer 700 for use in system 100 according to one embodiment of the invention. In the illustrated embodiment, computer 700 includes an input device 702, an output device 704, a processor 706, a memory 708 storing molten pool control tool 710 and heat management tool 712, and a storage location 714.

Input device 702 is coupled to computer 700 for allowing the user of system 100 to fabricate part 102. For example, although not illustrated in FIG. 7, a suitable CAD application, as described above, may be utilized by the user to create solid CAD model 103 for part 102. In addition, a suitable CAM application may be utilized to control the components of system 100 during the manufacturing of part 102. In one embodiment, input device 702 is a keyboard, however input device 702 may take other forms, such as a mouse, a stylus, a scanner, or any combination thereof. Output device 704 is any suitable visual display unit, such as an LCD or CRT display, that allows a user to see solid CAD model 103 as it is being created or part 102 as it is being fabricated. Output device 704 may also be coupled to a printer for the purpose of printing out any desired information, such as detailed drawings, or other suitable information.

Processor 706 comprises any suitable type of processing unit that executes logic. One of the functions of processor 706 is to retrieve molten pool control tool 710 or heat management tool 712 from memory 708 and execute those tools to control the fabrication of part 102. These functions of tools 710 and 712 are discussed more fully below in conjunction with FIGS. 8 and 9. Processor 706 may also control the retrieving and/or storing of information and other suitable data, such as any computer aided design or computer aided manufacturing data.

Molten pool control tool 710 is a computer program written in any suitable computer language. According to the teachings of one embodiment of the present invention, molten pool control tool 710 is operable to receive feedback from sensors and/or monitoring devices associated with system 100 and, based on that feedback, adjust any necessary parameters of the deposition process currently being employed for the deposition of a two-dimensional layer of part 102. Some of the functions of molten pool control tool 710 are described below in conjunction with FIG. 8.

Heat management tool 712 is a computer program written in any suitable computer language. According to the teachings of another embodiment of the present invention, heat management tool 712 is operable to adjust the parameters of a deposition process currently being employed for depositing a two-dimensional layer for part 102 based on the geometry of part 102 as denoted by solid CAD model 103. Some of the functions of heat management tool 712 are described below in conjunction with FIG. 9.

Memory 708 and storage location 714 may comprise files, stacks, databases, or other suitable organizations of volatile or non-volatile memory. Memory 708 and storage location 714 may be random access memory, read only memory, CD-ROM, removable memory devices, or any other suitable devices that allow storage and/or retrieval of data. Memory 708 and storage location 714 are interchangeable and may perform the same functions.

Figure 8A:
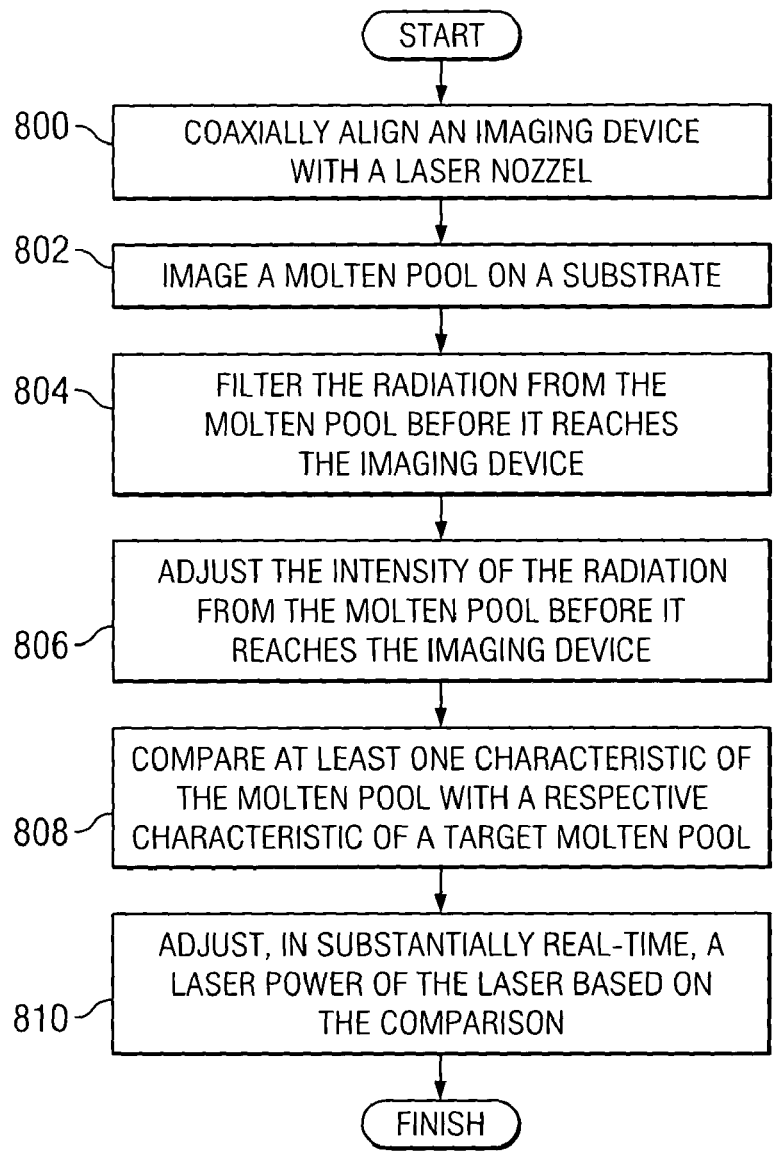
FIG. 8A is a flowchart illustrating an example method of controlling the size of the molten pool in laser-based additive manufacturing according to an embodiment of the invention.

FIG. 8A is a flowchart illustrating an example method of controlling the size of the molten pool in laser-based additive manufacturing according to an embodiment of the invention. The example method illustrated in FIG. 8A illustrates some of the functionality of molten pool control tool 710 (FIG. 7) and should be read with reference to FIG. 6.

The example method begins at step 800 where an imaging device, such as camera 600, is coaxially aligned with a laser nozzle, such as nozzle 51. Imaging device is utilized to image a molten pool on a substrate, as denoted by step 802. To protect camera 600 from laser damage and/or overexposure, the radiation from the molten pool is filtered, at step 804, before it reaches imaging device 600. This filtering may be facilitated by laser filter 602a and infrared filter 602b. Laser filter 602a, in one embodiment, is a type of optical filter and is utilized to protect the camera from laser damage. Infrared filter 602b may be utilized to eliminate the image noise created by the metal powder being delivered through nozzle 51. In one embodiment, the radiation wavelength received by camera 600 is between 0.7 and 1.06 micrometers.

The intensity of the radiation from the molten pool may also be adjusted, as denoted by step 806, before it reaches the imaging device. This may be facilitated by iris 604, which is utilized to adjust the intensity to prevent overexposure received by camera 600. As described above, imaging device may be any suitable imaging device, such as camera 600, and in some embodiments may be a high frame rate charge coupled device ("CCD") camera that is operable to image the molten pool at a rate of up to approximately eight hundred frames per second. In addition, imaging may be at a resolution of approximately 128×128 or other suitable resolutions.

At least one characteristic of the molten pool from the image is compared with a respective characteristic of a target molten pool, at step 808. Based on this comparison, the laser power of laser 60 may be adjusted in substantially real-time, as denoted by step 810. This adjustment in laser power may achieve a constant and controllable size of the molten pool in order to control the geometrical accuracy and material microstructure of the part being produced, such as part 102. The results of performing one embodiment of the example method as described above is shown below in conjunction with FIG. 8B.

Figure 8B:
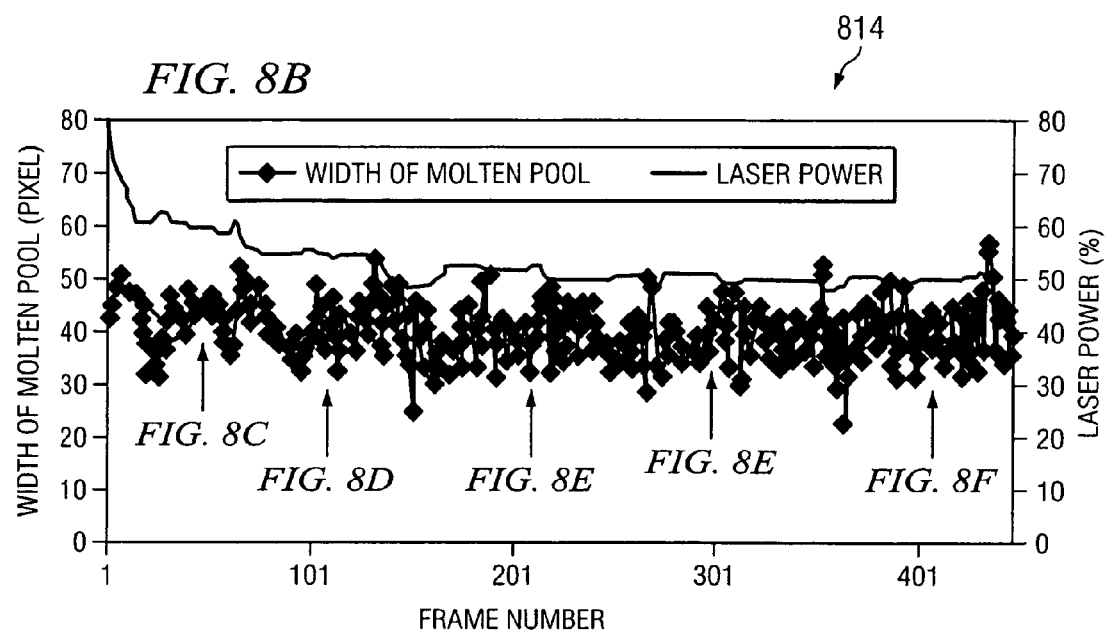
FIG. 8B illustrates an example graph and FIGS. 8C–8G illustrate example images from the graph of FIG. 8B showing successful control of a molten pool in laser-based additive manufacturing according to an embodiment of the invention.
Figures 8C, 8D, 8E:
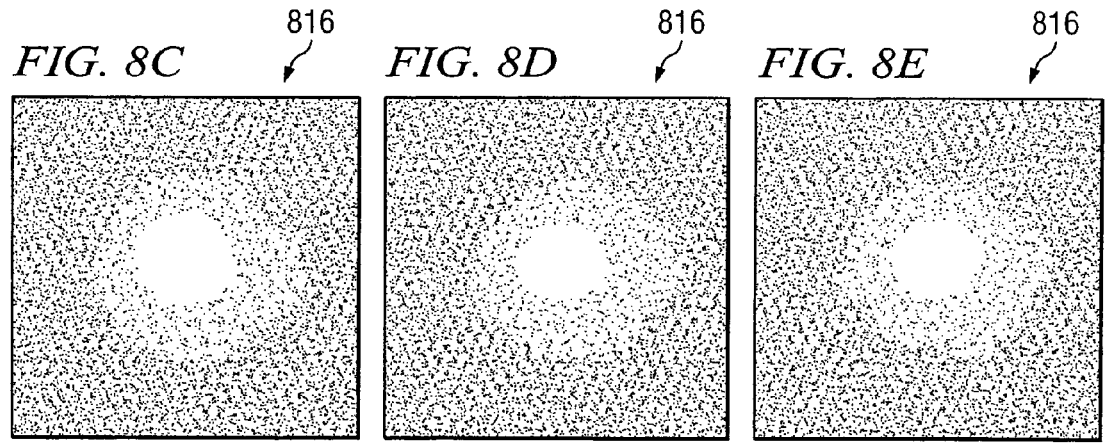
Figures 8F, 8G:
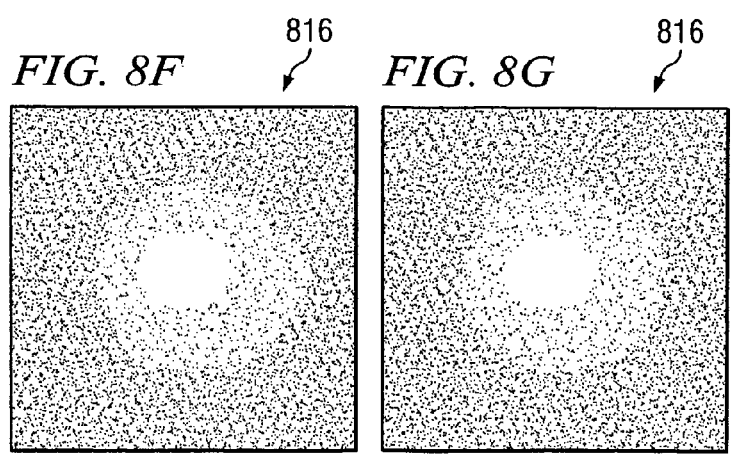

Referring to FIG. 8B, an example graph 814 is illustrated along with example images 816 showing successful control of the molten pool in laser-based additive manufacturing according to an embodiment of the invention. As illustrated in graph 814, the laser power to the laser is well correlated with the width of the molten pool, which in the illustrated embodiment is measured in pixels. This results in a relatively consistent and well controlled molten pool, as illustrated in the example images 816.

Figure 9:
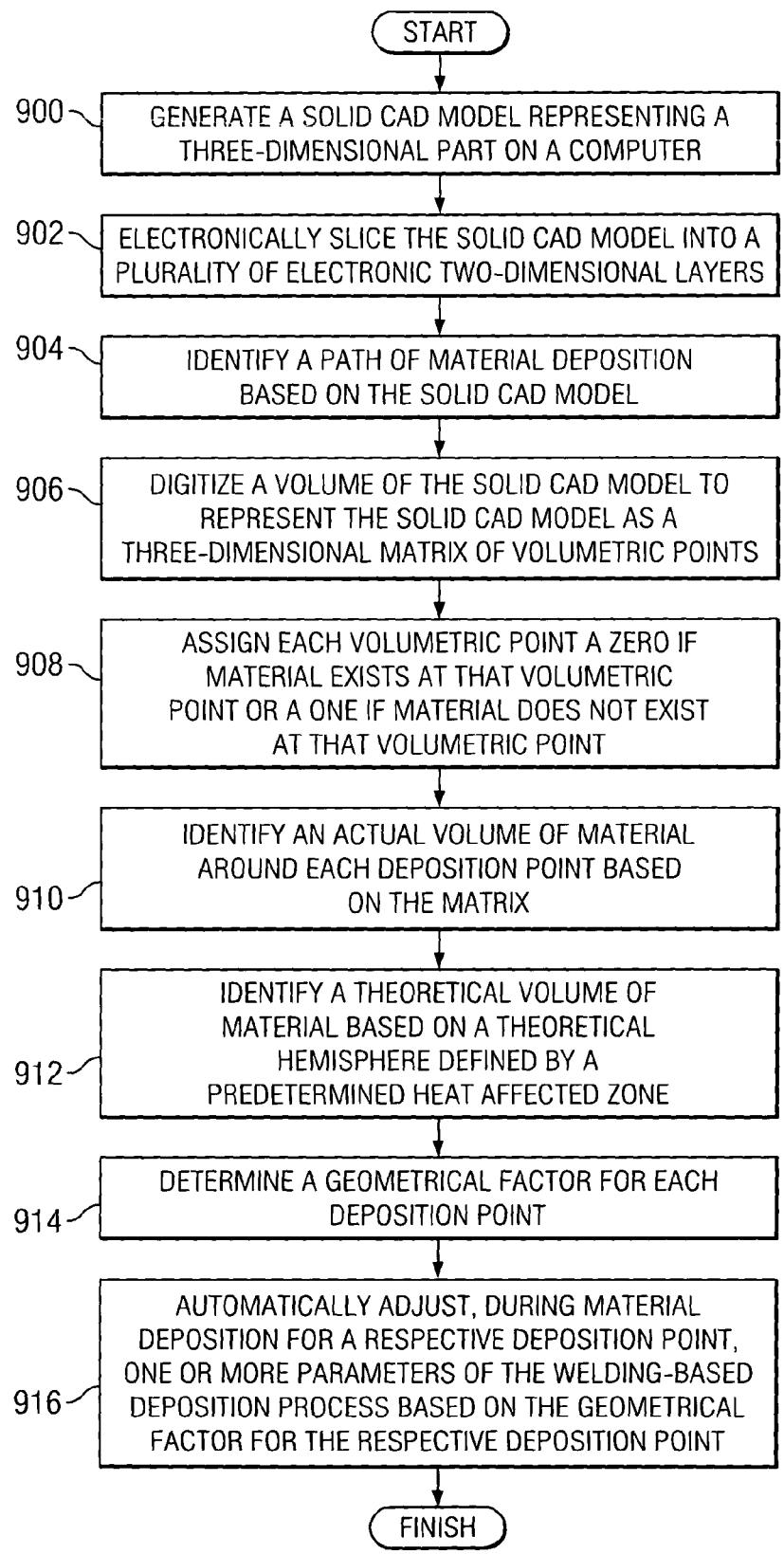
FIG. 9 is a flowchart illustrating an example method of controlling the operational weld parameters in welding-based deposition processes according to one embodiment of the invention.

FIG. 9 is a flowchart illustrating an example method of controlling the operational weld parameters in welding based deposition processes according to one embodiment of the invention. The example method outlined in FIG. 9 describes some of the functionality of heat management tool 712. The example method begins at step 900 where a solid CAD model, such as solid CAD model 103, representing a three-dimensional part, such as part 102, is generated on a computer, such as computer 700. Solid CAD model 103 is electronically sliced into a plurality of electronic two-dimensional layers, as denoted by step 902. Based on solid CAD model 103, a path of material deposition is identified at step 904.

A volume of solid CAD model 103 is then digitized to represent solid CAD model 103 as a three-dimensional matrix of volumetric points, as denoted by step 906. Each volumetric point is assigned either a zero if material exists at that volumetric point or a one if material does not exist at that volumetric point, as denoted by step 908. In this manner, an actual volume of material around each deposition point may be identified, at step 910, based on the three-dimensional matrix. A theoretical volume of material is also identified for each deposition point based on a theoretical hemisphere defined by a predetermined heat effected zone, as denoted by step 912. This theoretical hemisphere is based on an initial set of parameters for the particular welding based deposition process being employed.

A geometrical factor for each deposition point may then be determined at step 914. This geometrical factor, sometimes referred to as a "G" factor, is defined by a ratio of the actual volume of material around each deposition point identified at step 910 to the theoretical volume of material around each deposition point as identified in step 912. Accordingly, one or more parameters of the welding based deposition process being employed may be automatically adjusted during material deposition for a respective deposition point, as denoted by step 916. This automatic adjustment of the welding parameters is based on the geometrical factor for the respective deposition point. Examples of welding parameters that may be automatically adjusted include current, laser power, and plasma power.

Thus, homogeneous mechanical properties across the volume of the three-dimensional part, such as part 102, may be accomplished. This is due to the uniform cooling achieved because of the automatic adjustment of the welding parameters based on the above example method.

Although embodiments of the invention and their advantages are described in detail, a person skilled in the art could make various alterations, additions, and omissions without departing from the spirit and scope of the present invention as defined by the appended claims.

What is claimed is:

1. A method for controlling the size of the molten pool in a laser based additive manufacturing process, comprising:
    imaging, with an imaging device, a molten pool on a substrate, the molten pool created by a laser having a laser nozzle coaxially aligned with the imaging device;
    comparing at least one characteristic of the molten pool with a respective characteristic of a target molten pool; and
    adjusting, in substantially real-time, a laser power of the laser based on the comparison in order to correlate the characteristic of the molten pool with the respective characteristic of the target molten pool and thereby control the size of the molten pool.

2. The method of claim 1, wherein the imaging device is an infrared camera, the method further comprising coaxially aligning the infrared camera with a laser nozzle.

3. The method of claim 2, wherein the infrared camera is a high frame rate charge coupled device camera.

4. The method of claim 3, wherein imaging the molten pool comprises imaging the molten pool at a rate of up to approximately 800 frames per second.

5. The method of claim 1, wherein imaging the molten pool comprises imaging the molten pool at a resolution of approximately 128×128.

6. The method of claim 1, further comprising filtering the radiation from the molten pool with a laser filter before it reaches the imaging device.

7. The method of claim 1, further comprising filtering the radiation from the molten pool with an infrared filter before it reaches the imaging device to obtain a radiation wavelength between 0.7 and 1.06 micrometers.

8. The method of claim 1, further comprising adjusting the intensity of the radiation from the molten pool before it reaches the imaging device.

9. The method of claim 1, wherein comparing at least one characteristic of the molten pool comprises comparing a size of the molten pool.

10. The method of claim 1, wherein comparing at least one characteristic of the molten pool comprises comparing a shape of the molten pool.

11. Logic encoded in media for controlling the size of the molten pool in a laser based additive manufacturing process, the logic operable to:
receive an image from an imaging device of a molten pool on a substrate, the molten pool created by a laser having a laser nozzle coaxially aligned with the imaging device;
compare at least one characteristic of the molten pool with a respective characteristic of a target molten pool; and
adjust, in substantially real-time, a laser power of the laser based on the comparison in order to correlate the characteristic of the molten pool with the respective characteristic of the target molten pool and thereby control the size of the molten pool.

12. The logic encoded in media of claim 11, wherein the imaging device is a high frame rate charge coupled device camera.

13. The logic encoded in media of claim 11, wherein the image comprises a resolution of approximately 128×128.

14. The logic encoded in media of claim 11, the logic further operable to compare a size of the molten pool.

15. The logic encoded in media of claim 11, the logic further operable to compare a shape of the molten pool.

16. A system for controlling the size of the molten pool in a laser based additive manufacturing process, comprising:
a laser operable to create a molten pool on a substrate through a laser nozzle;
an imaging device coaxially aligned with a laser nozzle, the imaging device operable to image the molten pool;
a controller coupled to the imaging device, the controller operable to compare at least one characteristic of the molten pool with a respective characteristic of a target molten pool; and
the controller operable to adjust, in substantially real-time, a laser power of the laser based on the comparison in order to correlate the characteristic of the molten pool with the respective characteristic of the target molten pool and thereby control the size of the molten pool.

17. The system of claim 16, wherein the imaging device comprises an infrared camera.

18. The system of claim 17, wherein the infrared camera is a high frame rate charge coupled device camera.

19. The system of claim 18, wherein imaging device is operable to image the molten pool at a rate of up to approximately 800 frames per second.

20. The system of claim 16, wherein imaging device is operable to image the molten pool at a resolution of approximately 128×128.

21. The system of claim 16, further comprising a laser filter operable to filter the radiation from the molten pool before it reaches the imaging device.

22. The system of claim 16, further comprising an infrared filter operable to filter the radiation from the molten pool before it reaches the imaging device to obtain a radiation wavelength between 0.7 and 1.06 micrometers.

23. The system of claim 16, further comprising an iris operable to adjust the intensity of the radiation from the molten pool before it reaches the imaging device.

24. The system of claim 16, wherein the at least one characteristic of the molten pool comprises a size of the molten pool.

25. The system of claim 16, wherein the at least one characteristic of the molten pool comprises a shape of the molten pool.

26. A system for controlling the size of the molten pool in a laser based additive manufacturing process, comprising:
means for imaging a molten pool on a substrate, the molten pool created by a laser having a laser nozzle coaxially aligned with the imaging device;
means for comparing at least one characteristic of the molten pool with a respective characteristic of a target molten pool; and
means for adjusting, in substantially real-time, a laser power of the laser based on the comparison in order to correlate the characteristic of the molten pool with the respective characteristic of the target molten pool and thereby control the size of the molten pool.

* * * * *